United States Patent
Li et al.

(10) Patent No.: US 8,134,912 B2
(45) Date of Patent: Mar. 13, 2012

(54) APPARATUS, SYSTEMS AND METHODS ADAPTED FOR OPPORTUNISTIC FORWARDING OF UPLINK SHORT MESSAGES IN WIRELESS METROPOLITAN AREA NETWORKS

(75) Inventors: Qinghua Li, Sunnyvale, CA (US); Ozgur Oyman, Palo Alto, CA (US); Xintian E. Lin, Mountain View, CA (US); Hujun Yin, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 708 days.

(21) Appl. No.: 12/288,483

(22) Filed: Oct. 20, 2008

(65) Prior Publication Data

US 2010/0098037 A1 Apr. 22, 2010

(51) Int. Cl.
*H04J 11/00* (2006.01)
*H04B 7/204* (2006.01)
*H04B 7/216* (2006.01)
*H04B 7/14* (2006.01)

(52) U.S. Cl. ........ 370/203; 370/319; 370/335; 370/343; 455/7

(58) Field of Classification Search .................. 370/203, 370/208, 319–320, 335, 342–344; 455/410, 455/422.1, 425, 434, 435.1, 436, 438, 439, 455/450, 456.4, 456.5, 466, 574
See application file for complete search history.

(56) References Cited

U.S. PATENT DOCUMENTS

| | | | |
|---|---|---|---|
| 5,898,679 A * | 4/1999 | Brederveld et al. ........... | 370/315 |
| 7,299,027 B2 * | 11/2007 | Sudo .............................. | 455/303 |
| 2006/0165191 A1 * | 7/2006 | Lin et al. ....................... | 375/267 |
| 2007/0230373 A1 * | 10/2007 | Li et al. .......................... | 370/267 |
| 2009/0209199 A1 * | 8/2009 | Suga ................................ | 455/7 |
| 2009/0219853 A1 * | 9/2009 | Hart et al. ...................... | 370/315 |
| 2009/0252203 A1 * | 10/2009 | Goldhamer .................... | 375/211 |
| 2010/0027457 A1 * | 2/2010 | Okuda ............................ | 370/315 |
| 2010/0330902 A1 * | 12/2010 | Fujita ............................... | 455/7 |

* cited by examiner

*Primary Examiner* — Tri H Phan
(74) *Attorney, Agent, or Firm* — Thorpe North & Western LLP

(57) ABSTRACT

An embodiment of the present invention provides an apparatus, comprising a subscriber station (SS) operable to communicate with a base station (BS) and at least one additional subscriber station (SS) in a wireless metropolitan area network, wherein the at least one additional SS attempts to overhear a first message from the SS and piggy back a second message for the overheard message from the SS's uplink data to the BS with its uplink data.

23 Claims, 4 Drawing Sheets

APPARATUS, SYSTEMS AND METHODS ADAPTED FOR OPPORTUNISTIC FORWARDING OF UPLINK SHORT MESSAGES IN WIRELESS METROPOLITAN AREA NETWORKS

BACKGROUND

In wireless metropolitan area networks (WMANs) such as WiMAX, traffics in the uplink are usually short messages. For example, the short message may be an acknowledgement of a received packet, or a mouse click on a website, or a bandwidth request to send an email, or a beamforming matrix feedback due to a sudden channel variation, etc. These short messages are generated in a non-periodic or unpredictable fashion and thus it is hard for the base station to allocate resources (i.e. subchannels) for their transmission. In the current WiMAX systems, for example, either base station periodically polls the subscribers or the subscribers have to contend for the uplink resources to send the messages.

Both the polling and contention are inefficient and consume a significant system overhead. From channel coding perspective, the protection of short message is less efficient than that of the long message because the powerful channel codes require large block sizes. It is better to aggregate short messages and to encode them together.

Besides the increased overhead, the latency of the contention is unbounded, which is undesirable for delay sensitive applications. Although increasing the polling rate reduces the latency, the efficiency is also reduced because most of the polled subscribers do not have messages to send.

Thus, a strong need exists for improvements in existing schemes for short messages used in WMANS.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
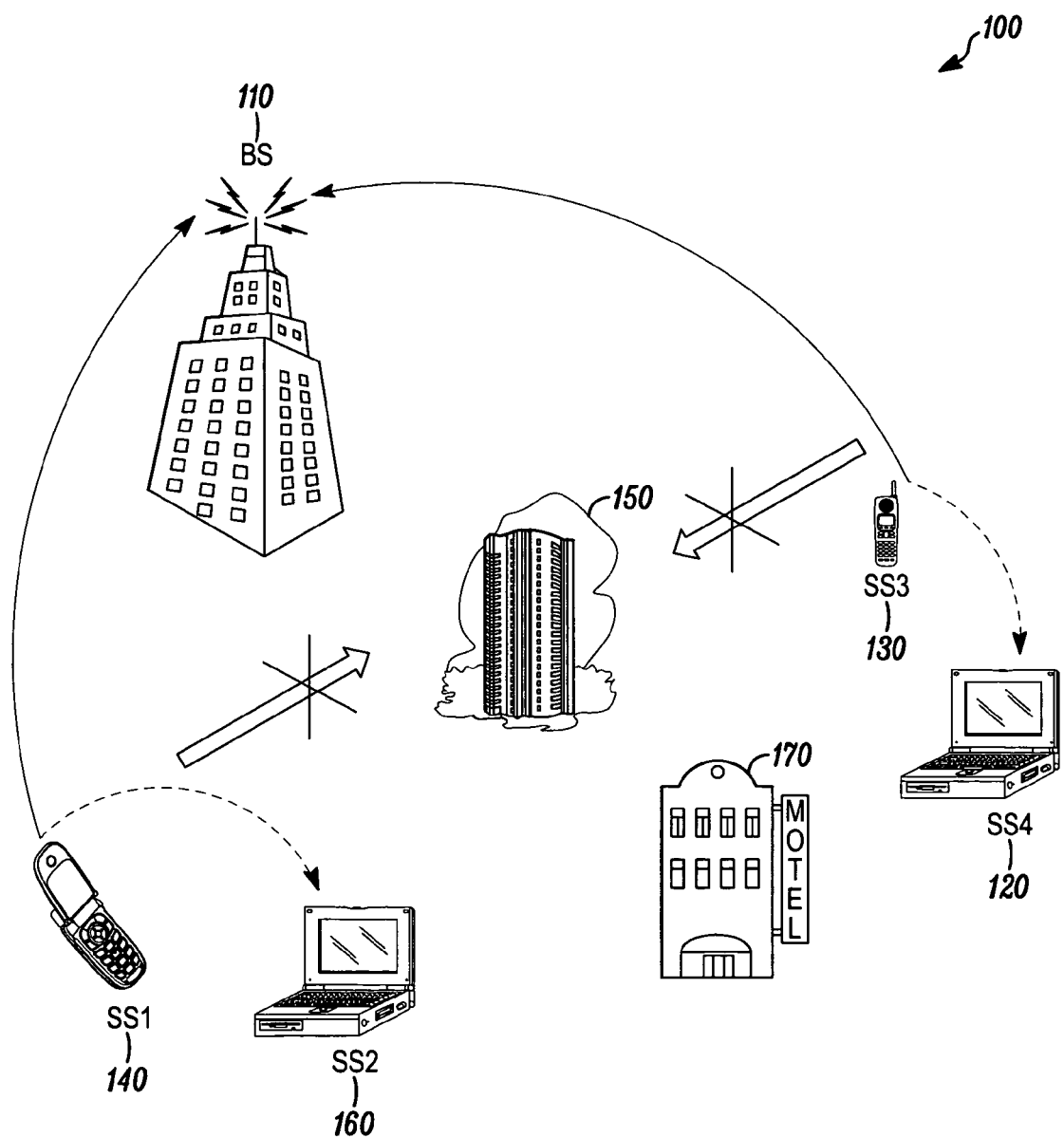
FIG. 1 provides an illustration of a collision at the base station and overhearing by a nearby subscriber of an embodiment of the invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

In WMANs such as WiMAX, the subscriber station sends the base station lots of spontaneous short messages. These messages are generated in a non-periodic or unpredictable fashion and thus it is hard for the base station to allocate time/frequency resources for the transmission of these messages. Examples of the message include mouse clicks during web surfing and uplink bandwidth requests. Either base station periodically polls the subscribers or the subscribers have to contend for the uplink resources to send the messages. Both the polling and contention are inefficient and consume a significant system overhead, whose efficiency is typically 30%. Besides the overhead, the latency of the contention is unbounded, which is undesirable for delay sensitive applications. An embodiment of the present invention, increases the throughput of short messages by opportunistic message forwarding, which exploits peer-to-peer connectivity among co-located subscribers with good (potentially LOS) links to each other and spatial isolation among subscribers far from each other. In WMANs, the subscribers far apart are isolated by large path loss because of the low antenna mounting and high surrounding buildings. However, the adjacent subscribers e.g. on the same floor can listen each other. Therefore, although the short messages simultaneously sent by the subscribers collide at the base station that has high antenna mounting, each message may still be received by the sender's neighboring subscribers.

If one of the neighbors happens to be allocated uplink transmission resource, it can squeeze the overheard short message into its uplink data and sends both to the base station. The aggregation of the short message and the original uplink data may obtain a better channel coding protection for the short message and lower packet error rates due to the increased block size. In addition, the system throughput is increased by contention overhead reduction and by augmented spatial reuse during the overhearing. If it is hard to squeeze the whole overheard short message into the allocated uplink resource block, the overhearing subscriber may send a bandwidth request using the allocated uplink resource block to ask for additional resource block. The additional resource block may be used for some part of the uplink data or the overheard short message. For example, the overhearing subscriber may cut some of its uplink data to accommodate the overheard short message in the originally allocated resource block and send the remaining data in the subsequently allocated resource block. Since the piggyback bandwidth request is contention free, the system throughput is improved.

Looking now at FIG. 1, generally as 100, is a WMAN such as WiMAX, wherein the base station (BS) 110 has high antenna mounting and thus can receive signals from all subscribers. On the other hand, the subscribers usually have low antenna mounting and thus they can not hear each other if they are far apart. This is because there are multiple high obstacles such as large buildings 120 and 150 on the propagation path between two subscribers and thus the path loss between two subscribers is much higher than that between a subscriber and the BS. However, the nearby subscribers, e.g., those on the same floor or in the same street, can still listen to each other (could potentially have line-of-sight connectivity).

As shown in FIG. 1, subscriber station 1 (SS1) 140 and subscriber station 3 (SS3) 130 have short messages to send the BS 110. For example, and not by way of limitation, they resort to the contention mechanism for uplink bandwidth. They send the BS CDMA ranging codes to request bandwidth. In the conventional scheme, if the arrivals of the codes collide and the BS 110 can not detect both, SS1 140 and SS3 130 have to try again later. Embodiments of the present invention remedy this problem by providing a scheme based on overhearing and opportunistic forwarding, which exploits peer-to-peer connectivity among co-located subscribers with good (potentially LOS) links to each other and spatial isolation among subscribers far from each other. Accordingly, the neighbor subscriber of SS1, i.e. subscriber SS2 160, can help SS1 140 in transmitting the short message belonging to SS1 140. In this context, we assume that SS2 160 has already been allocated uplink resources by the BS for its data transmission. Using its high-quality peer-to peer connectivity to SS1 140, SS2 160 attempts to overhear the CDMA code of SS1 140. If the interference from SS3 130 is blocked by the surrounding buildings as shown in FIG. 1, the overhearing attempt to SS2 160 succeeds. Then, SS2 will send its uplink data and the overheard CDMA code index for SS1's 140 bandwidth request together using a larger channel codeblock for better error protection (if the BS 110 does not acknowledge the reception of the CDMA code sent by SS1 140). The piggyback of the overheard short message cause negligible bandwidth to SS2 160, because the size of the short message is about the same as the length of the normal zero padding that is used to fill a FEC block. Besides, since higher modulation order and spatial multiplexing may be applied by SS2 160, the piggyback overhead is further reduced. Furthermore, if SS2 160 has to cut its data to accommodate the short message, then SS2 160 can piggyback a bandwidth request for the remaining data. The piggyback request for additional bandwidth is used in the existing system and it is much more efficient than the contention based request. Similarly, the co-located subscriber SS4 120 can help SS3 130 to submit the CDMA code. During the overhearing, a distributed multiple-input multiple-output (MIMO) system is formed by the antennas from three receivers, i.e., the BS 110, SS2 160, and SS4 120, and the antennas from the two senders, i.e., SS1 140 and SS3 130. Since there are more receive antennas than transmit antennas, the two simultaneously transmitted codes can be decoded in theory. The scheme presented under the CDMA code-based bandwidth request example discussed above can be generalized to other types of short message transmissions such as a service request generated by a mouse click on a website. Embodiments herein provide an efficient scheme for short messages next. The most popular mode of WiMAX is the OFDMA mode. In one embodiment, the overhearing SS may overhear a long message sent by a sending SS. Instead of forwarding the long message, the overhearing SS may convert the long overheard message into a short message to help the sending SS. For example, the overhearing SS may piggy back an uplink bandwidth request for the sending SS. In this way, the BS knows that the sending SS has data to send and allocates resource for the long message.

Figure 2A:
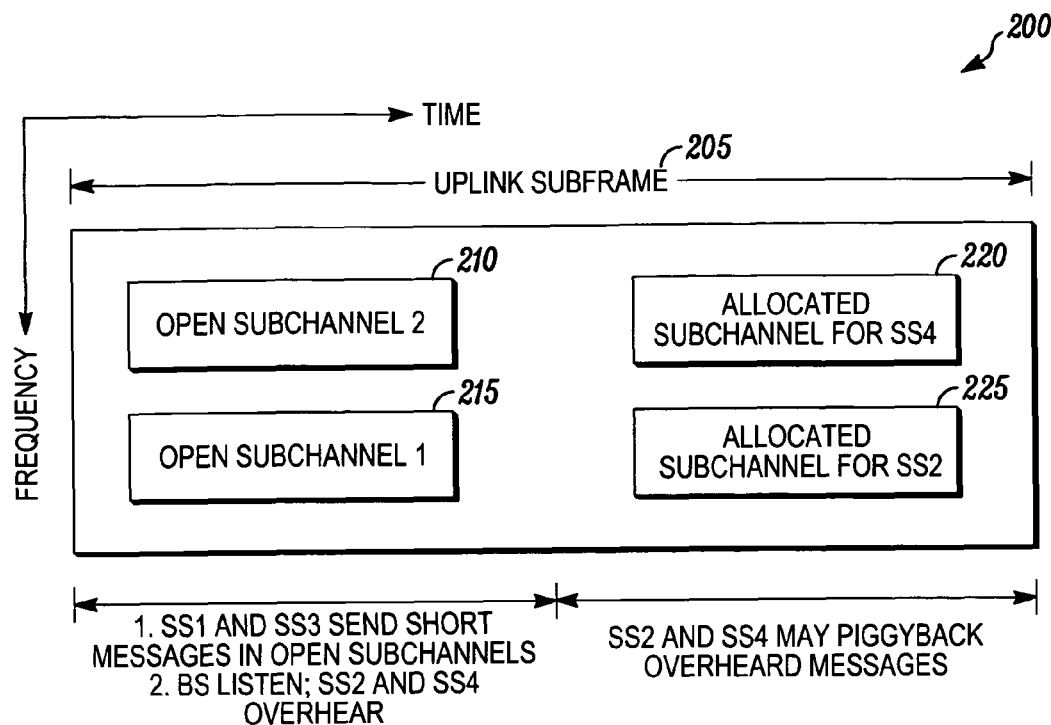
FIG. 2 illustrates the usage of open subchannels according to an embodiment of the invention.
Figure 2B:
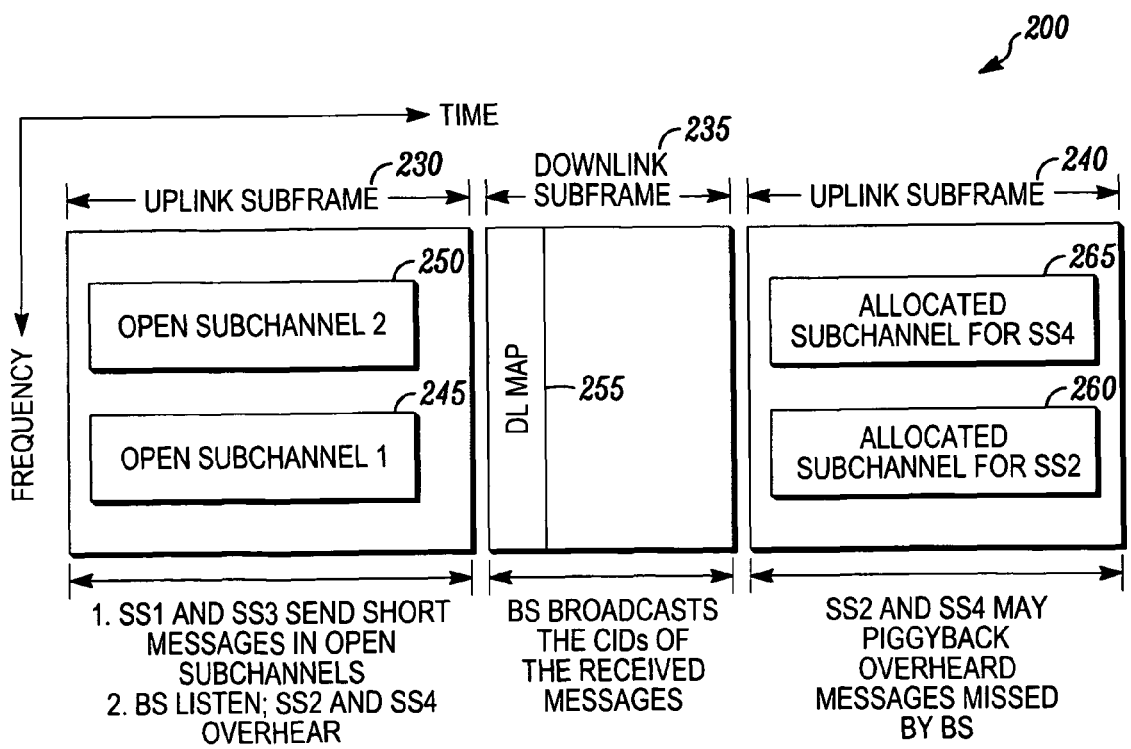

Turning now to FIG. 2, shown generally as 200, in the uplink subframe 205, the BS 110 allocates subchannels to scheduled subscribers for them to send their data respectively. The subchannel is a unit of time-frequency transmission resource. An embodiment of the present invention provides the allocation of some subchannels in the uplink subframe 205 for direct transmission of unscheduled short messages. These subchannels may be referred to herein as open subchannels 210 and 215. The usage of the open subchannels is illustrated in FIG. 2 at 200, where the station labels refer to FIG. 1. Short messages are directly sent to the open subchannels by the subscribers who do not have allocated uplink resource. The subscriber provides channel training symbols only for the demodulation of the open subchannel. In one embodiment, the open subchannel can randomly selected by each subscriber. In another embodiment, the selection of the open subchannel may contain some information. For example, the subscriber may compute from part of the short message to generate an index and use the index to select an open subchannel. The short message can be a beamforming matrix feedback due to sudden channel variation. The BS 110 and a set of distributed overhearing stations (e.g. SS2 160 and SS4 120) jointly receive the sent short messages. The overhearing station must have already been allocated subchannels in the same subframe latter than the open subchannels as shown in (a) of FIG. 2.

Since uplink allocation is broadcasted by the BS 110 one frame ahead in the current WiMAX, the overhearing station knows whether it should overhear or not. Moreover, it is desirable to allocate the open subchannels 210, 215 at the beginning of the uplink subframe 205 to increase the number of potential overhearing stations. The overheard messages are piggybacked by the overhearing stations with their data on allocated subchannels (allocated subchannel for SS4 at 220 and allocated subchannel for SS2 at 225) latter in the same uplink subframe 205 as shown in (a) of FIG. 2.

If the BS 110 receives the short message directly, then there is no need for the overhearing station to forward the message. The BS 110 may broadcast the acknowledgement of each short message received by itself in the next frame as shown in (b) of FIG. 2. Uplink subframe 230 may include open subchannel 1 245 and open subchannel 2 250. Downlink subframe with DL MAP is shown at 235 and Uplink subframe 240 may include allocated subchannel for SS4 265 and allocated subchannel for SS2 260. The BS 110 may broadcast the connection ID (CID) of the short message the BS 110 directly received, or the BS 110 may broadcast the open subchannel index where the short message is received correctly. The overhearing station may decide whether to piggyback according to the BS's 110 broadcast. This conditional forwarding increases the delay and may not be desirable as compared to the scheme in (a) of FIG. 2. Further, the BS 110 can adjust the number of open subchannels in each frame so that the mean number of simultaneous transmissions on the same open subchannel varies and the throughput is maximized. If too many overhearing stations forward the message for the same subscriber station, the BS 110 may ask some of the overhearing stations to stop the forwarding for the subscriber station. The BS 110 or the operator may give the overhearing station an incentive in terms of higher scheduling priority or fee deduction.

Figure 3:
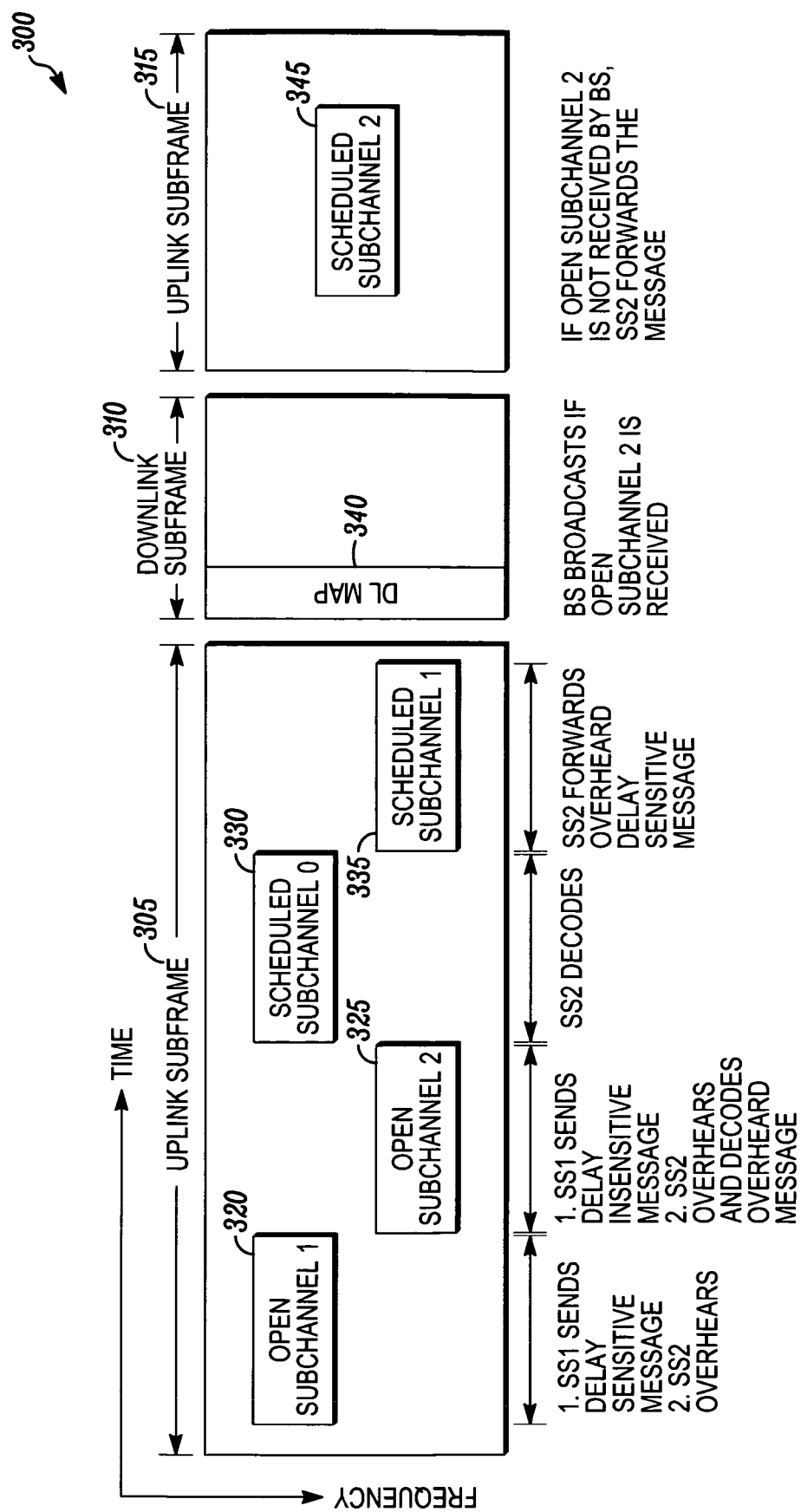
FIG. 3 illustrates the allocation of open subchannels for delay sensitive and delay insensitive short messages according to an embodiment of the present invention.

The techniques in (a) and (b) of FIG. 2 can be jointly applied as shown in FIG. 3. If FIG. 3 uplink subframe may include open subchannel 1 320, open subchannel 2 325, scheduled subchannel 0 330 and scheduled subchannel 1 335. Downlink subframe 310 may include DL MAP 340. Uplink subframe 315 may include scheduled subchannel 2 345. Short messages are categorized into delay sensitive and delay insensitive classes. Since decoding of the overheard message takes time, the BS 110 needs to reserve time for the decoding. In FIG. 3, open subchannels 320 and 325 for delay sensitive short messages are allocated at the beginning of the uplink subframe 305 so that the decoding time for the overhearing station can be maximized. Between the open subchannels 320 and 325 for the delay sensitive messages and the prescheduled subchannels 330 and 335 for the overhearing stations, open subchannels for delay insensitive messages and prescheduled subchannels for nonoverhearing stations may be allocated. The overhearing station may make uses to the gap to decode the overheard delay sensitive message first and then the delay insensitive one. If the decoding of the delay sensitive message is successful, the decoded message is squeezed into the prescheduled subchannel of the overhearing station and sent with the overhearer's uplink data. The overhearing station may continue to decode the delay insensitive message in the current uplink subframe 305 and decide whether to continue decode and forward the message based on the broadcasted acknowledgements of the open subchannels in the next downlink subframe 310. The overhearing station should not forward the messages that were already directly received by the BS 110. If the overheard message is not received by the BS 110, the overhearing station may forward it out in the next uplink subframe 315.

The main difference between the proposed technique and the conventional relay technique is that the proposed technique is opportunistic while the conventional relay is static. In the conventional relay, message forwarding is conducted for each packet constantly and requires lots of system overheads that set up the relay route and manage the retransmission and the bandwidth request of the each hop. In contrast, the proposed opportunistic technique skips the overheads, because the message forwarding occurs only if everything happens to be set for free. Namely, the overhearing to get the message is free because it doesn't cause interference, and the overhearing is conducted only if the overhearing station has already granted the uplink bandwidth latter in the subframe.

Furthermore, WiMAX network is interference limited. Strong interference from other co-channel transmissions can intermittently and randomly corrupt the reception of a given link. The conventional relay requests retransmissions for the corrupted packet, which causes overhead and directly fight with the interference by paying more transmission power and bandwidth. In contrast, in an embodiment of the present invention the opportunistic overhearing doesn't fight with the interference and only makes use of the good intervals of the channel. Finally, in an embodiment of the present invention, the base station may dynamically use spatial division multiple access (SDMA) to receive data from the different subsets of overhearing stations for high throughput and this dynamic is hard to schedule for the conventional relay. In sum, the gain of the proposed techniques is obtained from the overhead reduction, the increased spatial reuse of the multiple transmissions, and slightly the reduced path loss.

Figure 4:
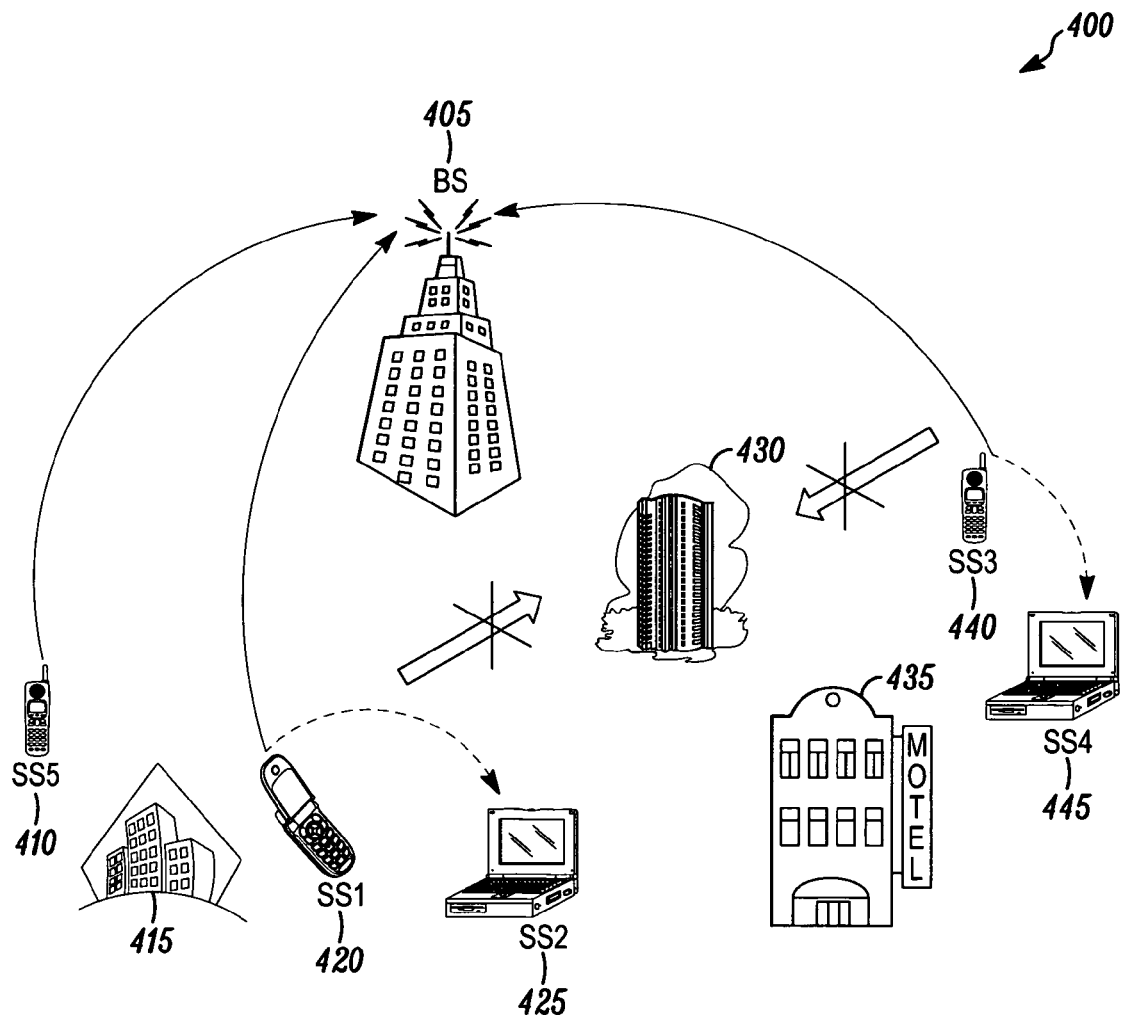
FIG. 4 is a graphic illustrating interference successive cancellation at the base station according to an embodiment of the present invention.

Multiuser detection and successive interference cancellation may be conducted in embodiments of the present invention. As shown in FIG. 4, generally as 400, three subscribers, i.e., SS1 420, SS3 440, and SS5 410, collide at the BS 405, the BS 405 can not decode the three collided short messages but it can buffer the received signal. Buildings causing interference between subscribers are shown at 415, 430 and 435. If SS2 425 and SS4 445 forward the overheard short messages of SS1 420 and SS3 440 to the BS 405 latter, the BS 405 can estimate the channel responses from SS1 420 and SS3 440 using the forwarded messages and then regenerate the received signal components from SS1 420 and SS3 440. The regenerated signals are subtracted from the buffered, received signal and only the signal from SS5 410 remains. The BS 405 can then decode SS5's 410 message.

In the case that the overhearing is not successful, the overhearing station may still be able to provide useful information. For example, the overhearing station may forward the reliability information of each overheard bit, which is called soft bit. The forwarded reliability information can be aggregated at the BS 405 and the BS 405 uses all the information including its own to decode messages. However, the soft bit may consume more forwarding bandwidth than the hard decision bit and reduces the efficiency.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. An apparatus, comprising:
a subscriber station (SS) operable to communicate with a base station (BS) and an additional SS in a wireless metropolitan area network, wherein the SS attempts to overhear a first uplink message from the additional SS to the BS and piggy back a second uplink message, wherein the second uplink message is sent in an uplink with the SS's uplink data to the BS and includes the overheard first uplink message.

2. The apparatus of claim 1, wherein the first uplink message is a short message, a band bandwidth allocation request, a service request, or a CDMA code.

3. The apparatus of claim 1, wherein said second uplink message is a CDMA code index or a short message.

4. The apparatus of claim 3, wherein the SS uses an OFDMA mode in an uplink subframe, the BS allocates scheduled subchannels to scheduled subscribers for the scheduled subscribers to send their data respectively and the BS allocates open subchannels in the uplink subframe for direct transmission of unscheduled short messages and the short messages are directly sent to the open subchannels by unscheduled subscribers who do not have an allocated uplink resource; and
the BS and a set of distributed overhearing SS jointly receive sent short messages for the allocated open subchannels in a same subframe as scheduled subchannels.

5. The apparatus of claim 4, wherein the unscheduled subscribers provide channel training symbols for the demodulation of an open subchannel and the open subchannel is randomly or selectively selected by each unscheduled subscriber.

6. The apparatus of claim 5, wherein the open subchannels are allocated at a beginning of the uplink subframe to increase the number of potential overhearing SSs, and overheard messages are piggybacked by overhearing SSs with their data on allocated scheduled subchannels later in a same uplink subframe.

7. The apparatus of claim 4, wherein said short message is a beamforming matrix feedback due to sudden channel variation.

8. The apparatus of claim 3, wherein the BS broadcasts an acknowledgement of each short message received without the assistance of piggyback messages, a connection identifier (CID) of the short message the BS directly received, or an open subchannel index where the short message is received correctly, and wherein an overhearing SS may determine whether to piggyback according to the BS's broadcast.

9. The apparatus of claim 8, wherein if too many overhearing SSs forward a message for a same SS, the BS may request some of the overhearing SSs to stop forwarding for the same SS.

10. The apparatus of claim 3, wherein the short messages are categorized into delay sensitive and delay insensitive classes and the BS reserves time for decoding the short messages; and wherein open subchannels for delay sensitive short messages are allocated at the beginning of an uplink subframe so that a decoding time for the overhearing SS can be maximized, and between the open subchannels for the delay sensitive messages and prescheduled subchannels for the overhearing SSs, open subchannels for delay insensitive messages and prescheduled subchannels for nonoverhearing SSs can be allocated.

11. The apparatus of claim 10, wherein the overhearing SSs use a gap to decode an overheard delay sensitive message first and then decode a delay insensitive message, and if the decoding of the delay sensitive message is successful, the decoded message is squeezed into the prescheduled subchannel of the overhearing SS and sent with an overhearing SS's uplink data; and wherein overhearing SSs continue to decode the delay insensitive messages in a current uplink subframe and determine whether to continue to decode and forward the message based on broadcasted acknowledgements of open subchannels in a next downlink subframe.

12. The apparatus of claim 1, wherein the second uplink message and the SS's uplink data are encoded in a channel code block larger than the first uplink message.

13. A method, comprising:

communicating by a first subscriber station (SS) with a base station (BS) and a second SS in a wireless metropolitan area network and attempting by the first SS to overhear a first message from the second SS and piggyback a second message for the overheard message from said first SS's uplink to the BS with the first SS's uplink data.

14. The method of claim 13, wherein said second SS's uplink data is a band bandwidth allocation request or service request.

15. The method of claim 13, wherein said second SS's uplink data is a short message.

16. The method of claim 15, further comprising using, by the second SS, an OFDMA mode in an uplink subframe, the BS allocates scheduled subchannels to scheduled subscribers for the scheduled subscribers to send their data respectively and the BS allocates open subchannels in the second SS's uplink subframe for direct transmission of unscheduled short messages and the short messages are directly sent to the open subchannels by unscheduled subscribers who do not have an allocated uplink resource; and the BS and a set of distributed overhearing SS jointly receive sent short messages for the allocated open subchannels in a same subframe as scheduled subchannels.

17. The method of claim 16, further comprising providing by the unscheduled subscribers channel training symbols for the demodulation of an open subchannel and the open subchannel is randomly selected by each unscheduled subscriber.

18. The method of claim 17, further comprising allocating the open subchannels at a beginning of the uplink subframe to increase the number of potential overhearing SSs, and overheard messages are piggybacked by overhearing SSs with their data on allocated scheduled subchannels later in a same uplink subframe.

19. The method of claim 16, wherein said short message is a beamforming matrix feedback due to sudden channel variation.

20. The method of claim 15, further comprising broadcasting by the BS an acknowledgement of each short message received without the assistance of piggyback messages, a connection identifier (CID) of the short message the BS directly received, or an open subchannel index where the short message is received correctly, and wherein an overhearing SS may determine whether to piggyback according to the BS's broadcast.

21. The method of claim 20, further comprising requesting some of the overhearing SSs by the BS to stop forwarding for a same SS if too many overhearing SSs forward a message for the same SS.

22. The method of claim 15, further comprising categorizing the short messages into delay sensitive and delay insensitive classes and reserving by the BS time for decoding the short messages; and wherein open subchannels for delay sensitive short messages are allocated at the beginning of an uplink subframe so that a decoding time for the overhearing SS can be maximized, and between the open subchannels for the delay sensitive messages and prescheduled subchannels for the overhearing SSs, open subchannels for delay insensitive messages and prescheduled subchannels for nonoverhearing SSs can be allocated.

23. The method of claim 22, further comprising using a gap by the overhearing SSs to decode an overheard delay sensitive message first and then decode a delay insensitive message, and if the decoding of the delay sensitive message is successful, the decoded message is squeezed into the prescheduled subchannel of the overhearing SS and sent with the overhearing SS's uplink data; and wherein overhearing SSs continue to decode the delay insensitive messages in a current uplink subframe and determine whether to continue to decode and forward the message based on broadcasted acknowledgements of open subchannels in a next downlink subframe.

* * * * *